United States Patent [19]

Low et al.

[11] Patent Number: 5,262,777
[45] Date of Patent: Nov. 16, 1993

[54] DEVICE FOR GENERATING MULTIDIMENSIONAL INPUT SIGNALS TO A COMPUTER

[75] Inventors: Thomas P. Low; Larry S. Gullman, both of LaHonda, Calif.

[73] Assignee: SRI International, Menlo Park, Calif.

[21] Appl. No.: 777,851

[22] Filed: Nov. 16, 1991

[51] Int. Cl.⁵ .................... H03K 17/94; G08C 21/00
[52] U.S. Cl. ........................... 341/20; 178/18;
    D14/18; 345/157
[58] Field of Search ............... 341/20, 34; 340/709,
    340/710, 711; 178/18, 19; D14/114

[56] References Cited

U.S. PATENT DOCUMENTS

| | | | |
|---|---|---|---|
| 4,465,908 | 8/1984 | Griffith et al. | |
| 4,489,938 | 12/1984 | Darzinskis. | |
| 4,550,221 | 10/1985 | Mabusth | 178/18 |
| 4,558,864 | 12/1985 | Medwedeff. | |
| 4,578,679 | 3/1986 | Baker et al. | 340/710 |
| 4,758,691 | 7/1988 | De Bruyne | 178/19 |
| 4,798,919 | 1/1989 | Miessler et al. | 178/18 |
| 4,839,838 | 6/1989 | LaBiche et al. | 390/709 |
| 4,998,457 | 3/1991 | Suzuki et al. | 341/34 |
| 5,095,303 | 3/1992 | Clark et al. | 340/709 |
| 5,128,671 | 7/1992 | Thomas, Jr. | 341/20 |
| 5,144,594 | 9/1992 | Gilchrist | 178/18 |

FOREIGN PATENT DOCUMENTS 9206465  4/1992  PCT Int'l Appl. ............... 340/710

Primary Examiner—Donald J. Yusko
Assistant Examiner—John E. Giust
Attorney, Agent, or Firm—Kenneth R. Allen

[57] ABSTRACT

The present invention is an input device for a computer is provided which generates input signals through a polyhedron having an enclosing surface, the polyhedron cooperating with sensing means for sensing pressure indicative of deformation forces applied externally to the enclosing surface to generate electrical signals indicative of the magnitude and location of pressure on the enclosing surface. Means are provided for coupling this array of electrical signals to the computer. In specific embodiments of the invention, the polyhedron may include means for sensing orientation in space and means for sensing location in space. In a still further embodiment, protrusions on the surface may be provided permitting a handler to pull upon the enclosing surface indicating a negative direction of applied pressure. The polyhedron may be defined by the intersection of the sphere and the cube such that the sphere includes six flat surfaces arranged mutually or diagonally and indicative of the three dimensions of real space.

20 Claims, 3 Drawing Sheets

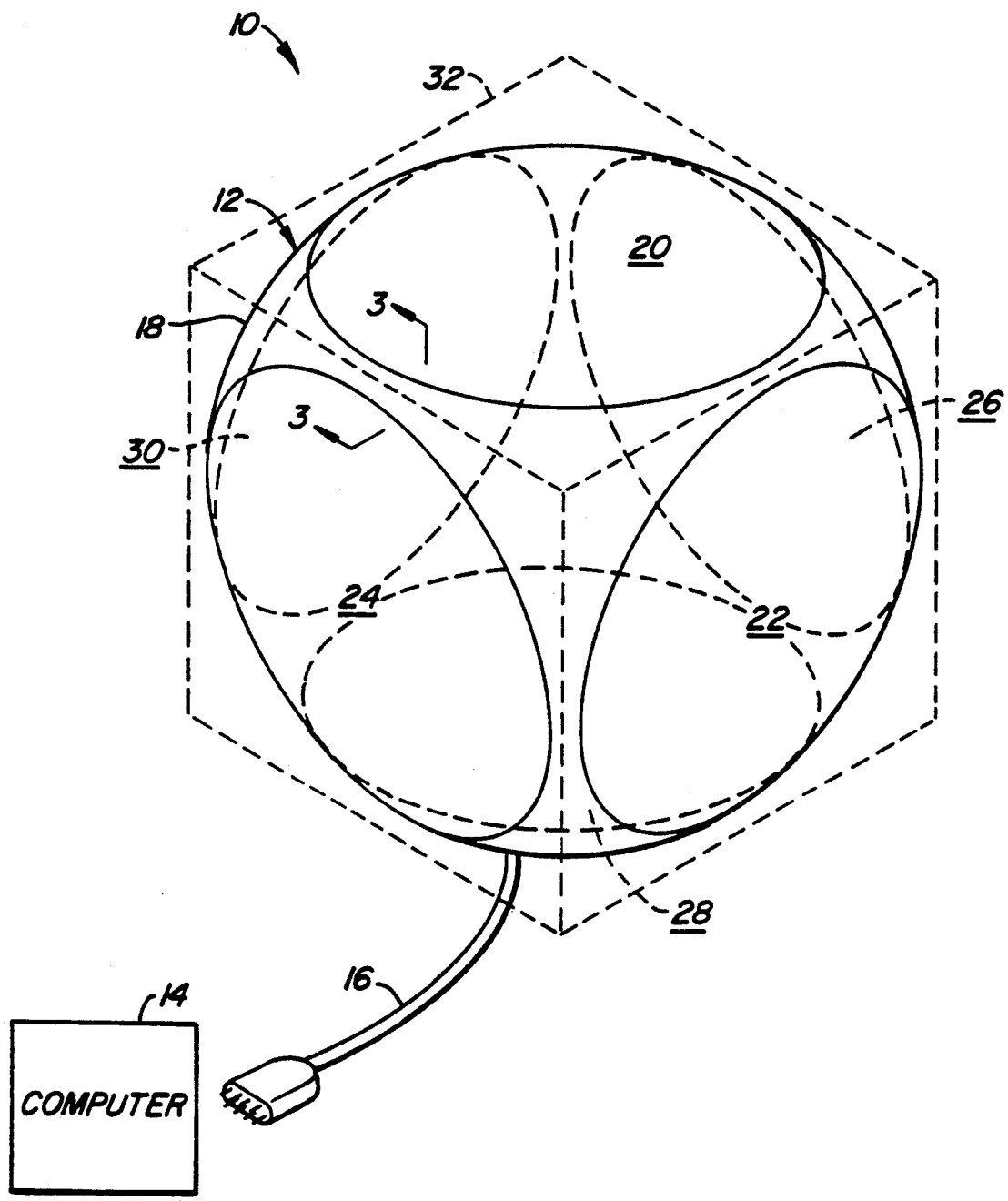
FIG._1.

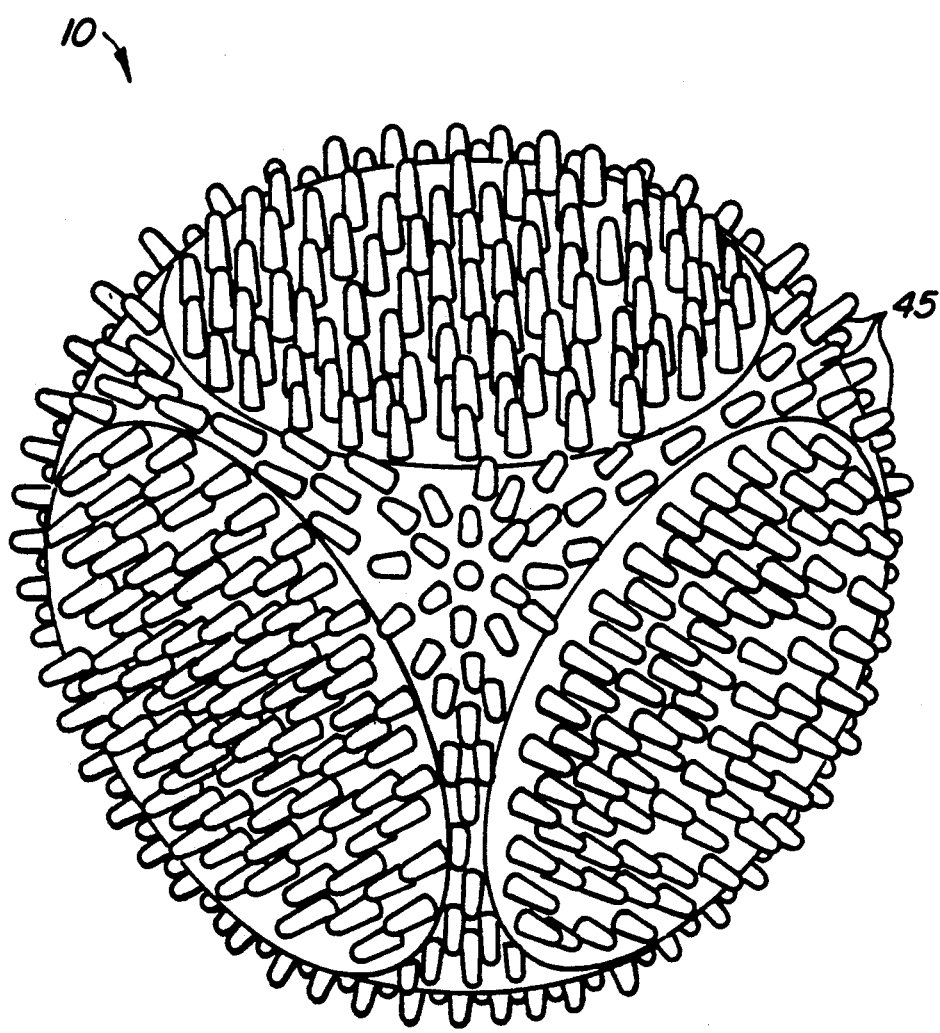
FIG._2.

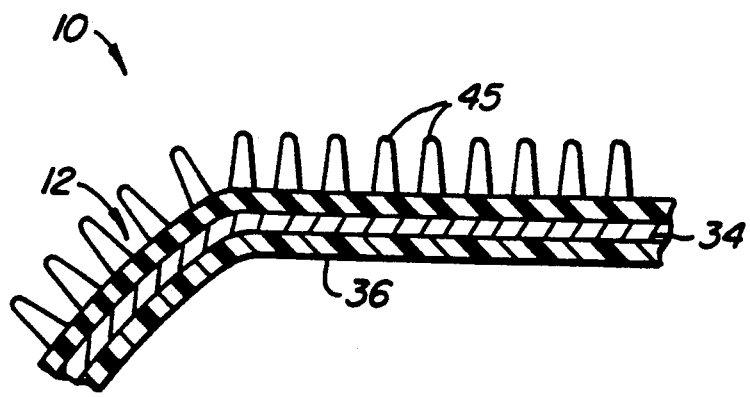
FIG._3.
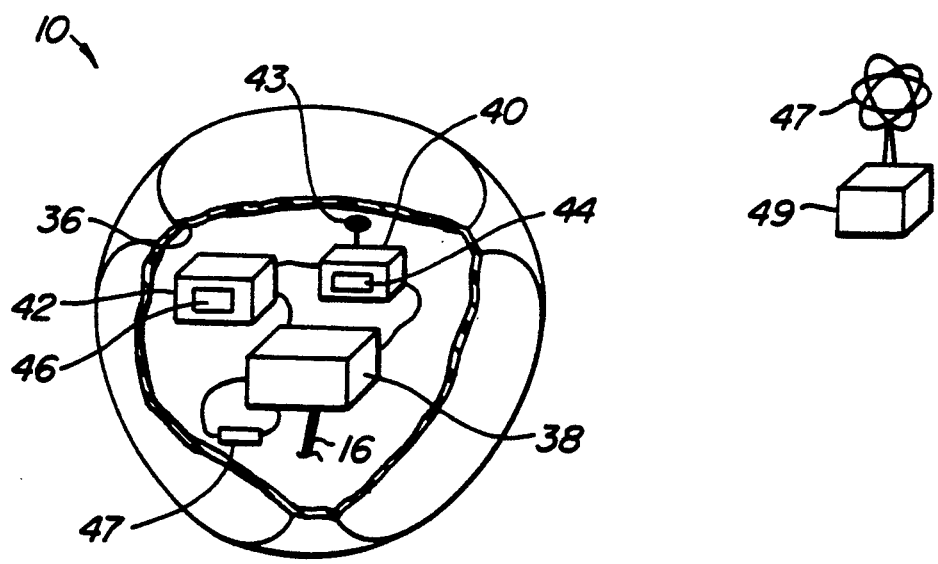
FIG._4.

DEVICE FOR GENERATING MULTIDIMENSIONAL INPUT SIGNALS TO A COMPUTER

BACKGROUND OF THE INVENTION

The present invention relates to input devices for computers, and in particular, to a device for providing input to a computer related to the orientation, location and pressure applied to the sensing means of the input device.

It is often useful to provide information about shapes and the like to a computer, particularly, in relation to the creation and manipulation of graphic images through a computer program. Most input devices for generating signals useful in graphic manipulation are two dimensional in nature, that is capable of providing input information in an x-axis and a y-axis corresponding approximately to x and y directions in connection with the graphical display. Examples of such input devices include the input mouse having x and y input parameters and a simple keying system through which selection signals may be generated. The selection signals may be used for a variety of purposes, such as changing of mode or indicating position within the output or presentation of the visual display.

Still other examples of x, y input devices are the joystick, the track ball and various hybrids thereof.

Other types of input devices are known. For example, U.S. Pat. No. 4,558,864 of Dec. 17, 1985, describes a Handgrip Exercising, Computer Game Controller consisting of a spring biased handgrip with a sensor for measuring the separation of two opposing handgrips.

U.S. Pat. No. 4,489,938 of Dec. 25, 1984, describes an exercise apparatus combining a stretching member with a video joystick input device.

U.S. Pat. No. 4,465,908 of Aug. 14, 1984, describes a hand controller for use in controlling the motion of a curser on a video display wherein a spherical surface is mounted on a flat plate such that the relative disposition of the spherical surface in the flat plate, caused by rocking forces, provide an input signal to control positioning of a curser. This represents a modification of the basic principle of an x-y joystick input device.

Still other input devices include an instrumented glove for measuring the displacement of the fingers of the hand containing the glove and various headgear which may measure positioning of the head upon movement.

What is needed is a computer input device capable of registering directly a complex array of input signals indicating a position, orientation and queues indicating desired shape or actions.

SUMMARY OF THE INVENTION

According to the invention, an input device for a computer is provided which generates input signals through a polyhedron having an enclosing surface, the polyhedron cooperating with sensing means for sensing pressure indicative of deformation forces applied externally to the enclosing surface to generate electrical signals indicative of the magnitude and location of pressure on the enclosing surface. Means are provided for coupling this array of electrical signals to the computer. In specific embodiments of the invention, the polyhedron may include means for sensing orientation in space and means for sensing location in space. In a still further embodiment, protrusions on the surface may be provided permitting a handler to pull upon the enclosing surface indicating a negative direction of applied pressure. The polyhedron may be defined by the intersection of a sphere and a cube such that the sphere includes six flat surfaces arranged mutually or diagonally and indicative of the three dimensions of real space. Orientation and translation may be sensed by an electromagnetically-based position and orientation sensor or by accelerometers and gyroscopic sensors. Pressure may be sensed by an array of force sensors embedded in the external surface or adjacent to the surface of the polyhedron.

The invention will be better understood by reference to the following detailed description in connection with the accompanying drawings.

BRIEF DESCRIPTION OF THE DRAWINGS

FIG. 1 is a prospective view of a first embodiment of the invention.

FIG. 2 is a prospective view of a second embodiment of the invention.

FIG. 3 is a cross-sectional view of a portion of the surface and undersurface of an embodiment of the invention.

FIG. 4 is a cutaway view showing elements of position and orientation sensors within the polyhedron.

DESCRIPTION OF THE PREFERRED EMBODIMENTS

Referring to FIG. 1, there is shown a polyhedral solid hereinafter referred to as a ball 10 comprising an enclosure 12 having spherical and/or planar surfaces through the deformation of which signals are generated and means for communicating with a computer 14 herein referred to as a device interface 16. In addition, within the enclosure 12 are sensing means as hereinafter explained. The enclosure 12 is preferably shaped to conform to boundaries defined by the intersection of a sphere in a cube. The spherical portion 18 is truncated by surfaces 20, 22, 24, 26, 28 and 30 disposed in pairs in mutually orthogonal directions as would correspond to the surface of a cube. The outline of a representative cube 32 is provided for reference.

The enclosure 12 is formed of a conformal material such as silicon rubber through which force can be transmitted to an underlying support surface (not shown). Referring to FIG. 3, there is shown a cross-section of one corner of the ball 10. The enclosure 12 has underlying its rubber surface an array of force sensors 34 disposed between the rubber coating of enclosure 12 and a solid shell 36.

Referring to FIG. 4, within the solid shell 36 are found processing electronic circuitry 38 connected to each of the force sensors 34 either directly or through an addressing scheme. The proximity and orientation sensing means are preferably a unitary device within the shell 36. An RF technique may be employed for determining location and orientation of the ball 10. One such RF device is a "Polhemus Tracker." In a "Polhemus Tracker," the proximity sensor 40 and the orientation sensor 42 are combined such that they comprise a receiver with three mutually-orthogonally-oriented antennas 43 disposed in a field surrounding the ball 10 generated by three mutually-orthogonally arranged antennas 47 which are coupled with a transmitter 49 fixed in the proximity of the ball 10. The antenna 43 may be, for example, rings disposed about a sphere. In the case of the ball 10 shown in FIG. 4 the receiving antennas may be on the surface of the sphere. Each ring of transmitting antennas 47 and the receiving antennas 43 is preferably disposed in an orientation with a central axis along one of three mutually orthogonal axes in space.

Alternatively the ball 10 may contain a separate proximity sensor 40 and orientation sensor 42. The proximity sensor 40 may include an accelerometer 44 for sensing relative motion and for converting the relative motion signal to a proximity signal indicative of relative positioning in free space. The orientation sensor 42 may include gyroscope means 46 for sensing orientation against inertial reference to indicate roll, pitch and yaw positions relative to an arbitrary reference.

The interface 16 may be a device or a medium of any kind for communicating information to a computer 14. The interface 16 may be a direct wire connection or it may be an IR or RF type communication element for wireless communication of information.

In operation, the ball 10 collects force signals over the surface area of the shell 36 and transforms the force signals into individual signals with an indication of location on the enclosure which can be processed either within the ball 10 itself or communicated serially or in parallel to the computer 14 for some form of processing. In the case of the Polhemus Tracker, location and orientation is further communicated by detection of signals transmitted sequentially from each of the ring antennas 47 and received on each of the three receiving ring antennas 43. The relative strengths of the signals received on each of the three receiving antennas 43 in the ball 10 is used in a three-dimensional calculation of relative location and orientation in the processing electronic circuitry 38. The partially or wholly-processed data is then conveyed by a tether or a low-power RF or IR transmitter to an input signal collection device, in the same or similar manner that a signal from a keyboard, trackball or mouse is communicated to a computer. The exact form of data collection and distribution is dependent on the target software. However, the signal form may, for example, emulate a two-dimensional input device (which may well limit the applicability of the signals so provided), or it could be adapted to direct input to a computer program which can make full use of the full range of three-dimensional force, location and orientation information contained in the signals.

Referring to FIG. 2 and FIG. 3, there is shown an alternative embodiment of the ball 10 which has been provided with an array of nubs 45 protruding from all surfaces of the enclosure 12 and preferably formed of the same silicon rubber as the enclosure 12. The nubs 45 facilitate pulling on the surface to detect a negative pressure to the underlying array of force sensors 34 on the surface of the shell 36 (FIG. 3).

The invention has now been explained with reference to specific embodiments. Other embodiments will be apparent to those of ordinary skill in the art. Therefore it is not intended that this invention be limited except as indicated by the abandoned claims.

What is claimed is:

1. An input device for generating input signals to a computer, said device comprising:
   a polyhedron having an enclosing surface;
   means coupled to said enclosing surface for sensing magnitude and direction of pressure applied externally to said enclosing surface and generating first electrical signals indicative of magnitude, direction and location of the pressure on said enclosing surface; and
   means for coupling said first electrical signals to the computer.

2. The input device according to claim 1 further including means at least partially internal to said polyhedron for sensing orientation in space of said polyhedron and generating second electrical signals indicative of the orientation in space.

3. The input device according to claim 1 further including means at least partially internal to said polyhedron for sensing location in space of said polyhedron and generating third electrical signals indicative of the location in space.

4. The input device according to claim 1 further including means at least partially internal to said polyhedron for sensing location in space and orientation in space of said polyhedron and generating third electrical signals.

5. The input device according to claim 4 wherein said pressure sensing means comprises an area array of force sensors disposed adjacent the surface of said polyhedron.

6. The input device according to claim 4 wherein said location/orientation sensing means at least partially internal to said polyhedron comprises range finding means in communication with an external reference means for establishing position of said polyhedron relative to said external reference means.

7. The input device according to claim 1 wherein said pressure sensing means comprises an area array of force sensors disposed adjacent the surface of said polyhedron.

8. An input device for generating input signals to a computer, said device comprising:
   a polyhedron having an enclosing surface, wherein said polyhedron is defined by the intersection of a sphere and a cube, the sphere having a diameter less than the diagonal of said cube and greater than the minimum distance between opposing faces of the cube;
   means coupled to said enclosing surface for sensing pressure applied externally to said enclosing surface and generating first electrical signals indicative of magnitude and location of the pressure on said enclosing surface; and
   means for coupling said first electrical signals to the computer.

9. An input device for generating input signals to a computer, said device comprising:
   a polyhedron having an enclosing surface;
   means coupled to said enclosing surface for sensing pressure applied externally to said enclosing surface and generating first electrical signals indicative of magnitude of the pressure and locations of the pressure, the locations being in two dimensions in at least two positions around said enclosing surface; and
   means for coupling said first electrical signals to the computer.

10. An input device for generating input signals to a computer, said device comprising:
   a polyhedron having an enclosing surface, said polyhedron being defined by the intersection of a sphere and a cube, the sphere having a diameter less than the diagonal of said cube and greater than the minimum distance between opposing faces of the cube;

first means for sensing pressure applied externally to said enclosing surface and generating first electrical signals indicative of magnitude and location of the pressure on said enclosing surface;

second means at least partially internal to said polyhedron for sensing orientation in space of said polyhedron and generating second electrical signals;

third means at least partially internal to said polyhedron for sensing location in space of said polyhedron and generating third electrical signals; and means for coupling said first, second and third electrical signals to the computer.

11. The input device according to claim 10 wherein said enclosing surface includes protrusions disposed on said enclosing surface to facilitate pulling upon said enclosing surface.

12. The input device according to claim 11 wherein said pressure sensing means comprises an area array of force sensors disposed adjacent the surface of said polyhedron.

13. The input device according to claim 10 wherein said location/orientation sensing means at least partially internal to said polyhedron comprise means employing remote signals for establishing location and orientation.

14. The input device according to claim 10 wherein said location/orientation sensing means at least partially internal to said polyhedron comprises gyroscope means disposed within said polyhedron.

15. The input device according to claim 10 wherein said location/orientation sensing means at least partially internal to said polyhedron comprises range finding means in communication with an external reference means for establishing position of said polyhedron relative to said external reference means.

16. The input device according to claim 15 wherein said location/orientation sensing means at least partially internal to said polyhedron comprises angular position sensing means in communication with said external reference means for establishing orientation of said polyhedron relative to said external reference means.

17. An input device for generating input signals to a computer, said device comprising:

a polyhedron having an enclosing surface, wherein said enclosing surface includes means for facilitating application of negative pressure upon said enclosing surface;

means coupled to said enclosing surface for sensing pressure applied externally to said enclosing surface and generating first electrical signals indicative of magnitude and location of the pressure on said enclosing surface; and means for coupling said first electrical signals to the computer.

18. The input device according to claim 17 wherein said negative pressure application facilitating means comprises protrusions disposed on said enclosing surface.

19. The input device according to claim 17 further including means at least partially internal to said polyhedron for sensing orientation in space of said polyhedron and generating second electrical signals indicative of the orientation in space.

20. The input device according to claim 17 further including means at least partially internal to said polyhedron for sensing location in space of said polyhedron and generating third electrical signals indicative of the location in space.

* * * * *